United States Patent
Patankar et al.

(10) Patent No.: US 12,202,931 B2
(45) Date of Patent: Jan. 21, 2025

(54) POLYURETHANE CAST ELASTOMERS BASED ON POLY(BUTYLENE OXIDE) POLYOLS AND METHOD FOR MAKING POLYURETHANE CAST ELASTOMERS

(71) Applicant: Dow Global Technologies LLC, Midland, MI (US)

(72) Inventors: Kshitish A. Patankar, Midland, MI (US); Arjun Raghuraman, Pearland, TX (US); Thomas P. Willumstad, Pearland, TX (US); Mark F. Sonnenschein, Midland, MI (US); Jody Henning, Midland, MI (US); Heather A. Spinney, Midland, MI (US); David R. Wilson, Midland, MI (US); Sukrit Mukhopadhyay, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 700 days.

(21) Appl. No.: 17/277,187

(22) PCT Filed: Sep. 17, 2019

(86) PCT No.: PCT/US2019/051572
§ 371 (c)(1),
(2) Date: Mar. 17, 2021

(87) PCT Pub. No.: WO2020/068494
PCT Pub. Date: Apr. 2, 2020

(65) Prior Publication Data
US 2022/0033567 A1 Feb. 3, 2022

Related U.S. Application Data

(60) Provisional application No. 62/738,625, filed on Sep. 28, 2018.

(51) Int. Cl.
*C08G 18/79* (2006.01)
*C08G 18/10* (2006.01)
*C08G 18/22* (2006.01)
*C08G 18/32* (2006.01)
*C08G 18/48* (2006.01)
*C08G 18/66* (2006.01)
*C08G 65/26* (2006.01)

(52) U.S. Cl.
CPC ........... *C08G 18/797* (2013.01); *C08G 18/10* (2013.01); *C08G 18/22* (2013.01); *C08G 18/3206* (2013.01); *C08G 18/4841* (2013.01); *C08G 18/4854* (2013.01); *C08G 18/6674* (2013.01); *C08G 65/2609* (2013.01); *C08G 65/2654* (2013.01)

(58) Field of Classification Search
CPC .............. C08G 18/797; C08G 18/3206; C08G 18/4841; C08G 18/4854; C08G 18/6674; C08G 65/2609; C08G 65/2654; C08G 18/10; C08G 18/22
See application file for complete search history.

(56) References Cited

U.S. PATENT DOCUMENTS

| 4,301,110 | A | 11/1981 | Cuscurida |
| 9,896,542 | B2 * | 2/2018 | Raghuraman ............ B01J 27/26 |
| 2004/0030093 | A1 | 2/2004 | Sakurai |

FOREIGN PATENT DOCUMENTS

| GB | 1063278 A | 3/1967 |
| WO | 2019/055734 A | 3/2019 |
| WO | 2019/055740 A | 3/2019 |

* cited by examiner

Primary Examiner — Rabon A Sergent

(57) ABSTRACT

Hydroxyl-containing copolymers of butylene oxide and ethylene oxide having a hydroxyl equivalent weight of at least 150, an average of 1.8 to 6 hydroxyl groups per molecule of which hydroxyl groups at least 70% are primary hydroxyl groups and an oxyethylene content of no greater than 10% by weight based on the weight of the copolymer, are useful for making polyurethanes. These polyols are characterized by high reactivity and fast curing times. Polyurethanes made using these polyols have excellent mechanical properties and are highly hydrophobic.

6 Claims, No Drawings

POLYURETHANE CAST ELASTOMERS BASED ON POLY(BUTYLENE OXIDE) POLYOLS AND METHOD FOR MAKING POLYURETHANE CAST ELASTOMERS

This invention pertains to polyurethanes and methods for making such polyurethanes.

Polyurethane cast elastomers are typically segmented polymers that have "soft" and "hard" segments. The soft segment has a low glass transition temperature, whereas the hard segment is characterized as having a glass transition temperature well above room temperature. Differentiation into these segments arises from the raw materials used to make the elastomers. The soft segments are derived from polyols that have hydroxyl equivalent weights of 350 or more. Polyether polyols are very commonly used in cast polyurethane formulations to produce the soft segment. The hard segments are derived from polyisocyanates and chain extenders.

Poly(butylene oxide) polyols are potentially excellent candidates for making polyurethane cast elastomer products, in part because they are very hydrophobic materials and impart hydrophobicity to the elastomer. Their use in industrial processes is highly limited, however, due to the slow reactivity of their terminal secondary hydroxyl groups. Poly(butylene oxide)-based cast elastomer formulations react so slowly that prolonged curing times are necessary. This slows production rates, decreases equipment usage, and increases costs.

A common way to increase the reactivity of poly(butylene oxide) is to cap the end of the polymer chains with ethylene oxide. This introduces faster-reacting primary hydroxyl groups. Unfortunately, this has not proven to be an acceptable solution. Ethylene oxide adds only with difficulty to the secondary hydroxyl group at the end of a poly(butylene oxide) chain. Conversely, ethylene oxide adds very rapidly to a primary hydroxyl group, such as is formed when another molecule of ethylene oxide ring-opens. As a result, it is very difficult to obtain high concentrations of primary hydroxyl groups by adding ethylene oxide onto poly(butylene oxide). What tends to happen is that when secondary hydroxyl groups become oxyethylated to form primary hydroxyl groups, further ethylene oxide polymerization takes place almost exclusively at those sites, instead of being distributed across all chains. The result is that most chain ends have no terminal (primary hydroxyl) oxyethylene groups while a few chain ends have long poly(ethylene oxide) chains. This is detrimental for two reasons: The molecular weight distribution is broadened (due to the combination of shorter chains of poly(butylene oxide) terminated with secondary hydroxyl groups with longer chains of poly(butylene oxide) capped by long poly(ethylene oxide) chains), and most of the hydroxyl groups in the product tend to be the slow-reacting secondary hydroxyl groups. The latter problem can be overcome to some extent by polymerizing large amounts of ethylene oxide onto the poly(butylene oxide). Gradually more and more of the chain ends will become oxyethylated, but the overall content of oxyethylene groups becomes high and the desired hydrophobic character of the polyol and resulting elastomer become lost.

Therefore, a poly(butylene oxide) polyol that has greater reactivity yet remains highly hydrophobic is wanted. Similarly, a process for preparing cast polyurethane elastomers from a poly(butylene oxide) polyol, which exhibits reasonably short curing times yet produces a hydrophobic elastomer, is also wanted.

The invention in one aspect is a hydroxyl-containing copolymer of butylene oxide and ethylene oxide, the copolymer of butylene oxide and ethylene oxide having a hydroxyl equivalent weight of at least 150, an average of 1.8 to 6 hydroxyl groups per molecule of which hydroxyl groups at least 70% are primary hydroxyl groups, and an oxyethylene content of no greater than 10% by weight based on the weight of the copolymer.

This copolymer is characterized by having faster reactivity than a poly(butylene oxide) homopolymer of similar equivalent weight and hydroxyl functionality, while also being hydrophobic.

This invention in another aspect is a polyurethane which is a reaction product of at least one polyisocyanate, at least one chain extender and/or at least one crosslinker and at least one hydroxyl-containing copolymer of butylene oxide and ethylene oxide, the copolymer of butylene oxide and ethylene oxide having a hydroxyl equivalent weight of at least 150, an average of 1.8 to 6 hydroxyl groups per molecule of which hydroxyl groups at least 70% are primary hydroxyl groups, and an oxyethylene content of no greater than 10% by weight based on the weight of the copolymer.

The polyurethanes are highly hydrophobic, as characterized by low moisture pick-up according to the test method described below, and have very good mechanical properties.

The invention is in another aspect a one-shot method for making a polyurethane, comprising forming a reaction mixture comprising one or more polyisocyanates, wherein the one or more polyisocyanates has a number average isocyanate equivalent weight of no greater than 200, and isocyanate-reactive materials that include at least one chain extender and/or at least one crosslinker and at least one hydroxyl-containing copolymer of butylene oxide and ethylene oxide, the copolymer of butylene oxide and ethylene oxide having a hydroxyl equivalent weight of at least 150, an average of 1.8 to 6 hydroxyl groups per molecule of which hydroxyl groups at least 70% are primary hydroxyl groups, and an oxyethylene content of no greater than 10% by weight based on the weight of the copolymer, and curing the reaction mixture in one step to form the polyurethane.

The process is characterized by reasonably short curing times and in producing hydrophobic polyurethanes that have very good mechanical properties.

For purposes of this invention, the "one-shot" process is characterized in that i) the polyisocyanate(s) have a number average isocyanate equivalent weight of no more than 200; and ii) the polyisocyanate(s), chain extender and/or crosslinker and polyether polyol(s) having a hydroxyl equivalent weight of at least 150 are all formed into a mixture and cured such that the chain extender and/or crosslinker and polyether polyol(s) all react simultaneously with the polyisocyanate(s).

A "prepolymer" process is characterized in that i) at least 50% by weight of the polyol(s) having a hydroxyl equivalent weight of 150 or more are first reacted with the polyisocyanate(s) to form a urethane group-containing, isocyanate-terminated prepolymer having an isocyanate content of 20% or less by weight, and then ii) the prepolymer is subsequently cured by reaction with the chain extender and any remaining polyols having a hydroxyl equivalent weight of 150 or more to produce the polyurethane.

The polyisocyanate(s) each (if more than one) are organic compounds having two or more isocyanate groups per molecule. The polyisocyanate(s) preferably have a number average of no more than 4 isocyanate groups and more preferably have a number average of no more than 3 or no more than 2.7 isocyanate groups per molecule. In some embodiments the polyisocyanates have a number average of 2 to 2.5 or 2 to 2.3 isocyanate groups per molecule.

The polyisocyanate(s) have a number average isocyanate equivalent weight of up to 200, such as 80 to 200, 80 to 180, or 80 to 150.

Among the useful polyisocyanate compounds are aromatic polyisocyanates such as m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4"-triphenyl methane triisocyanate, polymethylene polyphenylisocyanate (PMDI), toluene-2,4, 6-triisocyanate and 4,4'-dimethyldiphenylmethane-2,2',5,5'-tetraisocyanate. Modified aromatic polyisocyanates that contain urethane, urea, biuret, carbodiimide, uretoneimine, allophanate or other groups formed by reaction of an isocyanate group are also useful. A preferred aromatic polyisocyanate is MDI (any one or more isomers of diphenyl methane diisocyanate) or PMDI (or a mixture thereof that is commonly referred to as "polymeric MDI"), and so-called "liquid MDI" products that are mixtures of MDI and MDI derivatives that have biuret, carbodiimide, uretoneimine and/or allophonate linkages.

Further useful polyisocyanate compounds having an isocyanate equivalent weight of up to 200 include one or more aliphatic polyisocyanates. Examples of these include cyclohexane diisocyanate, 1,3- and/or 1,4-bis(isocyanatomethyl) cyclohexane, 1-methyl-cyclohexane-2,4-diisocyanate, 1-methyl-cyclohexane-2,6-diisocyanate, methylene dicyclohexane diisocyanate, isophorone diisocyanate and hexamethylene diisocyanate, any of which may be modified to contain urethane, urea, biuret, carbodiimide, uretoneimine, allophanate or other groups formed by reaction of an isocyanate group.

The chain extender for purposes of this invention is a compound having exactly two isocyanate-reactive groups per molecule and an equivalent weight per isocyanate-reactive group of less than 150. The isocyanate-reactive groups may be, for example, hydroxyl and/or primary and/or secondary amino groups.

Examples of hydroxyl group containing chain extenders include 1,2-ethane diol, 1,2- or 1,3-propane diol, 1,4-butane diol, diethylene glycol, triethylene glycol, dipropylene glycol, tripropylene glycol, neopentyl glycol and alkoxylates of any of the foregoing having a hydroxyl equivalent weight of less than 150.

Examples of diamine chain extenders include aliphatic polyamines such as ethylene diamine, piperazine, diethylene triamine, triethylene tetraamine, tetraethylenepentaaminepiperazine, N-(2-aminoethyl)piperazine, N,N'-bis(2-aminoethyl)piperazine, cyclohexane diamine (including any one or more of the 1,2-, 1,3- and 1,4-isomers), bis(aminomethyl)cyclohexane (including any one or more of the 1,2-, 1,3- and 1,4-isomers) and bis(2-aminoethyl)cyclohexane, and aromatic polyamines such as toluene diamine, diethyltoluenediamine, methylenediphenyldiamine phenylene diamine and bis(aminomethyl)benzene.

Examples of crosslinkers include glycerin, trimethylolpropane, trimethylolethane, erythritol, pentaerythritol, triethanolamine, diethanolamine and alkoxylates of any of the foregoing having a hydroxyl equivalent weight of less than 175. Aminoalcohols such as monoethanolamine and diethanolamine are also useful crosslinkers.

At least 50% of the polyols having a hydroxyl equivalent weight of 150 or more are one or more hydroxyl-containing copolymers of butylene oxide and ethylene oxide, which copolymer(s) are characterized by a) having a hydroxyl equivalent weight of at least 150, b) having a number average of 1.8 to 6 hydroxyl groups per molecule, c) at least 70% of its hydroxyl groups are primary hydroxyl groups and d) having an oxyethylene content of no greater than 10% by weight based on the weight of the polymer.

Oxyethylene groups constitute no more than 10% of the total weight of the copolymer. Oxyethylene groups may constitute at least 2%, at least 3% or at least 5% of the total weight of the copolymer. —$CH_2$—$CH(CH_2$—$CH_3)$—O— groups as are formed when butylene oxide polymerizes preferably constitute at least 50%, or at least 65% of the weight of the copolymer, and may constitute, for example, up to 98%, up to 95% or up to 90% of the weight of the copolymer.

The copolymer of butylene oxide and ethylene oxide may also contain oxypropylene groups. Oxypropylene groups, if present at all, may constitute at least 1%, at least 5% or at least 10% of the weight of the copolymer and, for example, up to 40%, up to 30% or up to 25% of the weight of the copolymer.

The oxyethylene groups preferably are present in the form of single units or blocks at the termini of the polymer chains, so as to produce the desired primary hydroxyl groups.

The oxybutylene groups preferably are present in the form of one or more internal blocks, and/or within blocks of randomly copolymerized butylene oxide and propylene oxide and/or ethylene oxide. Oxypropylene groups, if present, may form one or more internal blocks and/or reside in one or more blocks of randomly copolymerized butylene oxide and ethylene oxide.

In some embodiments, the hydroxyl-containing copolymer of butylene oxide and ethylene oxide contains one or more internal poly(butylene oxide) blocks and one or more terminal poly(ethylene oxide) blocks. In other embodiments, the hydroxyl-containing copolymer of butylene oxide and ethylene oxide contains one or more internal poly(propylene oxide) blocks, one or more poly(butylene oxide) blocks external to the poly(propylene oxide) block or blocks, and one or more terminal poly(ethylene oxide) blocks external to the poly(butylene oxide) blocks.

The number average hydroxyl functionality of the hydroxyl-containing copolymer of butylene oxide and ethylene oxide may be at least 1.9 or at least 2.0 and may be up to 4.0, up to 3.2, up to 3.0, up to 2.5 or up to 2.2. For purposes of this invention, all hydroxyl functionalities are nominal functionalities, equal to the number average hydroxyl groups per molecule of the starter(s) used to prepare the polymer.

The hydroxyl equivalent weight may be at least 200, at least 400, at least 500, at least 700 or at least 800 and may be, for example, up to 3000, up to 2500, up to 2000, up to 1750, up to 1500 or up to 1200. Hydroxyl equivalent weight is determined by measuring the hydroxyl number in mg KOH/g polyol using titration methods, and converting the hydroxyl number to a hydroxyl equivalent weight using the relationship equivalent weight=56,100÷hydroxyl number.

In some embodiments, at least 70% or at least 75% of the hydroxyl groups of the copolymer of butylene oxide and ethylene oxide are primary. Typically, up to 95%, up to 90% or up to 85% of the hydroxyl groups are primary. Primary hydroxyl content can be determined by $^9F$ NMR analysis of a trifluoroacetic anhydride derivative of the polyol.

The hydroxyl-containing copolymer of butylene oxide and ethylene oxide preferably has a polydispersity (weight-average molecular weight divided by number-average molecular weight, in each case determined by gel permeation chromatography (GPC) against polyether polyol or polystyrene standards), of no greater than 1.75. The polydispersity may be, for example, 1.00 to 1.16, 1.00 to 1.15, 1.00 to 1.12, 1.00 to 1.10, 1.00 to 1.08 or 1.00 to 1.06.

The hydroxyl-containing copolymer of butylene oxide and ethylene oxide preferably contains at most small quantities of acetals. Acetals can be formed in some alkylene oxide polymerization processes through the formation and subsequent reaction of aldehyde-containing species as described, for example, by Raghuraman et al. in *Macromolecules* 2016, 49(18), pp. 6790-6798. The hydroxyl-containing copolymer of butylene oxide and ethylene oxide preferably contains at most 5 mole-% acetals, and more preferably no more than 2 mole-%, no more than 1.5 mole-% or no more than 1 mole-% thereof, based on the moles of carbon atoms in the polymer. Acetal content can be determined by inverse-gated $^{13}$C NMR spectroscopy. A suitable procedure is as follows: Samples are prepared in 10-mm NMR tubes as ~90% solutions in DMSO-d6. $^{13}$C NMR data is acquired using a Bruker Avance 400-MHz spectrometer equipped with a cryoprobe or equivalent apparatus, using at least 64 transient scans and a 30-second relaxation delay (optimized for quantitative measurements). The acquisition is carried out using spectral width of 25000 Hz and a file size of 65K data points. Relative moles of acetal species are measured by integrating the area under resonances from acetal carbons.

Mole % acetal=100%×relative moles of acetal carbon÷sum of relative moles of all carbon species in the spectrum.

The hydroxyl-containing polymer of butylene oxide and ethylene oxide can be made by polymerizing the oxides in the presence of a Lewis acid catalyst having the general formula

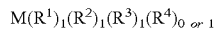

$M(R^1)_1(R^2)_1(R^3)_1(R^4)_{0\ or\ 1}$ wherein M is boron, aluminum, indium, bismuth or erbium, $R^1$ is a fluoroalkyl-substituted phenyl group and $R^2$ and $R^3$ each are a fluoroalkyl-substituted phenyl group a fluoro-substituted phenyl group, a chloro-substituted phenyl group, or a fluoro- and chloro-substituted phenyl group provided that $R^1$, $R^2$ and $R^3$ are not all the same. Optional $R^4$ is a functional group or functional polymer group. The M in the general formula may exist as a metal salt ion or as an integrally bonded part of the formula.

The at least one fluoroalkyl substituent of the fluoroalkyl-substituted phenyl group $R^1$ may be, for example, a fluorine-substituted alkyl group having, for example, 1 to 5 carbon atoms. Fluorine-substituted methyl groups are preferred. The alkyl groups contain at least one fluorine substituent and may have any greater number up to being perfluorinated. A preferred fluoroalkyl substituent includes a —CF$_3$ moiety. In some embodiments the fluoroalkyl substituents are —CF$_3$.

The fluoroalkyl-substituted phenyl group $R^1$ can be substituted with 1 to 5 fluoroalkyl groups. The fluoroalkyl groups can occupy any of the positions on the phenyl ring. In some embodiments, the $R^1$ group is substituted with 2 fluoroalkyl groups, which may be positioned at the 2 and 5 carbons or the 3 and 5 carbons. In specific embodiments, the fluoroalkyl-substituted phenyl group $R^1$ is 2,5- or 3,5-bis(trifluoromethyl)phenyl. In some embodiments, $R^1$ is optionally substituted with fluoro and/or chloro groups.

$R^1$, may be substituted to include other groups in addition to the at least one fluoroalkyl group, e.g., a fluorine atom and/or chlorine atom that replaces at least one hydrogen of the phenyl group.

$R^2$ and $R^3$, if a fluoroalkyl-substituted phenyl group, is as described with regard to $R^1$, provided that at least one of $R^2$ and $R^3$ is different than $R^1$. $R^2$ and/or $R^3$ may be fluoro-substituted and/or chloro-substituted, instead of or in addition to being fluoroalkyl-substituted. The phenyl group $R^2$ or $R^3$ may be substituted with 1 to 5 fluoroalkyl, fluorine and/or chlorine atoms. Examples of $R^2$ and $R_3$ groups include, in addition to 2,5- or 3,5-bis(trifluoromethyl)phenyl,

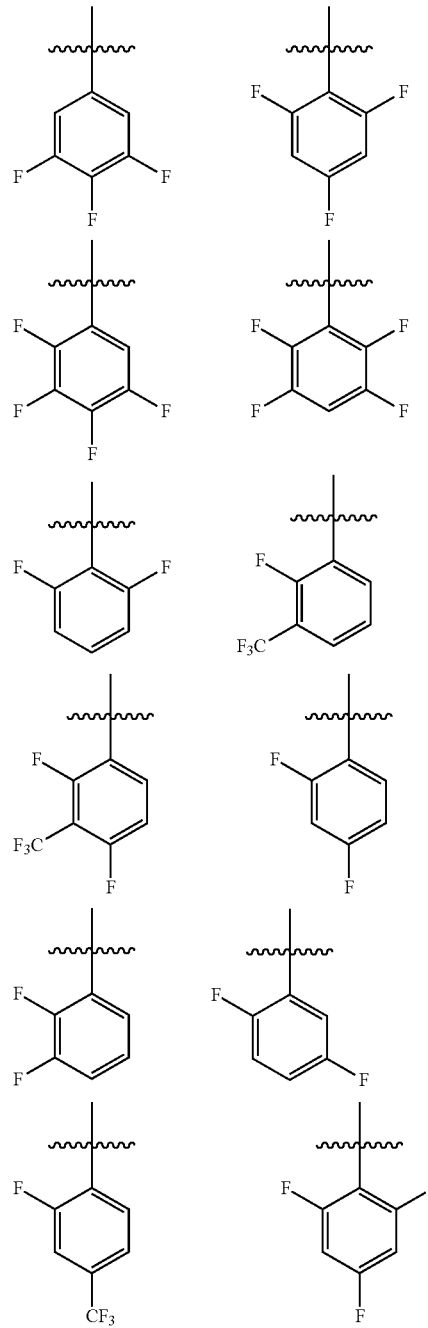

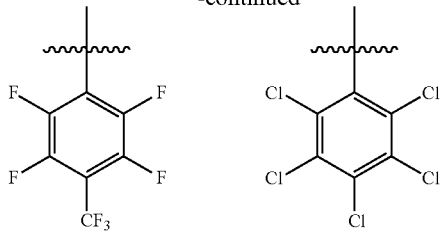

With respect to optional $R^4$, the functional group or functional polymer group may be a Lewis base that forms a complex with the Lewis acid catalyst. By functional group or functional polymer group it is meant a molecule that contains at least one of the following: water, an alcohol, an alkoxy (examples include a linear or branched ether and a cyclic ether), a linear or branched ether, a cyclic ether, an aldehyde, a ketone, an ester, an organosilane, an organosiloxane, an oxime, and substituted analogs thereof. Each of the alcohol, linear or branched ether, cyclic ether, aldehyde, ketone, ester, alkoxy, organosilane, organosiloxane, and oxime may include 2 to 20 carbon atoms, 2 to 12 carbon atoms, 2 to 8 carbon atoms, and/or 3 to 6 carbon atoms.

For example, the functional group or functional polymer group may have the formula $(OY_mH)_n$, wherein O is oxygen, H is hydrogen, Y is alkylene, m is zero or one and n is an integer (e.g., an integer from 1 to 100). However, other known functional groups or functional polymer groups combinable with the Lewis acid catalyst can be used. Exemplary cyclic ethers include tetrahydrofuran and tetrahydropyran.

Suitable $R^4$ groups include diethyl ether, cyclopentyl methyl ether, methyl tertiary-butyl ether, tetrahydrofuran, tetrahydropyran, 1,4-dioxane, acetone, methyl isopropyl ketone, isopropyl acetate, and isobutyl acetate.

Methods for making such catalysts are described, for example, in PCT/US2018/050995 and PCT/US2018/051001, both filed 14 Sep. 2018.

Examples of suitable Lewis acid catalysts as described above include (2,5-bis(trifluoromethyl)phenyl)bis(3,5-bis(trifluoromethyl) phenyl)borane, bis(2,5-bis(trifluoromethyl)phenyl)(3,5-bis(trifluoromethyl) phenyl)borane, bis(3,5-bis(trifluoromethyl)phenyl)(2,3,5,6-tetrafluoro-4-(trifluoromethyl) phenyl)borane, bis(3,5-bis(trifluoromethyl)phenyl)(pentachlorophenyl)borane, and the tetrahydrofuran (THF) adduct of bis(3,5-bis(trifluoromethyl)phenyl)(2,4,6-trifluorophenyl)borane.

Polyurethanes are made by reacting i) one or more polyisocyanates as described above with isocyanate-reactive materials that include ii) at least one chain and/or at least one crosslinker, iii) one or more polyols having a hydroxyl equivalent weight of at least 150, and iv) at least one urethane catalyst, wherein at least 50% of the weight of iii) is a hydroxyl-containing copolymer of butylene oxide and ethylene oxide as described herein. The reaction mixture may also include one or more optional materials as described below. This reaction can be performed using either a prepolymer or one-shot process, although some particular benefits of the invention are realized when the one-shot process is used.

In some embodiments, the relative amounts of isocyanate-reactive materials, chain extenders and/or crosslinkers and polyols are selected so the polyurethane has a hard segment content of 15 to 60% by weight. Hard segment content is calculated from the weights of starting materials, as follows:

$$\text{Hard segment } (\%) = 100\% \times (wt_{isocyanate} + wt_{chain\ extender\ plus\ crosslinker}) \div (wt_{isocyanate} + wt_{chain\ extender\ plus\ crosslinker} + wt_{polyol}),$$

wherein $wt_{polyol}$ includes the weight of all isocyanate-reactive materials having hydroxyl equivalent weights greater than 150. The hard segment content may be at least 20%, at least 30% or at least 35% and may be up to 55% or up to 50%, in all cases by weight.

The reaction mixture may contain various optional ingredients. Among these are other isocyanate-reactive materials, different from the chain extender and/or crosslinker and hydroxyl-containing copolymer of butylene oxide and ethylene oxide as described above. This includes, for example, one or more polyether polyols, one or more polyester polyols, polyalkylene carbonate polyols, hydroxyl-terminated diene rubbers, polyvinyl alcohols, and amine-terminated polyethers. The hydroxyl-containing polymer of butylene oxide and ethylene oxide constitutes at least 50% of the total weight of all isocyanate-reactive materials having equivalent weights of 150 or more, and may constitute at least 70%, at least 80%, at least 90% or at least 95% thereof to as much as 100% thereof. The optional isocyanate-reactive materials, if present at all, preferably constitute no more than 10%, no more than 5%, more than 3% or no more than 1% of the combined weight of all polyisocyanates and all isocyanate-reactive components of the reaction mixture.

Other optional ingredients include, for example, particulate fillers, colorants, catalysts, surfactants, desiccants and/or water scavengers, antioxidants, preservatives, biocides, reinforcing fibers, thixotropic agents and the like.

The reaction mixture preferably contains no more than 5 weight percent or less than 2 weight percent (and may be devoid of) a solvent. A solvent for purposes of this invention is a material having a boiling temperature of 200° C. or less at standard pressure and which is not isocyanate-containing and is not isocyanate-reactive (i.e., does not contain isocyanate-reactive groups).

Polyurethanes are made in the prepolymer process by first forming a urethane group-containing, isocyanate terminated prepolymer by reacting at least a portion of the polyol(s) having a hydroxyl equivalent weight of at least 150 with the polyisocyanate and then curing the prepolymer through reaction with the chain extender and/or crosslinker. A portion of the chain extender and/or crosslinker can be present during prepolymer formation and, similarly, a portion of the polyol(s) having an equivalent weight of 150 or more can be present during the curing step. The prepolymer may have an isocyanate content of at least 1%, at least 2%, at least 3% or at least 4%, up to 20%, up to 15%, up to 12% or up to 10%.

Polyurethanes are made in the one-shot process by forming a reaction mixture containing the polyisocyanate(s), chain extenders and/or crosslinkers, and polyol(s) having an equivalent weight of 150 or more and curing them all at once.

The process of the invention is particularly suitable for producing polyurethane elastomers, sealants and/or adhesives, and coatings.

Elastomers are generally characterized in being flexible materials having an elongation to break of at least 100% as measured according to ASTM D638. An elastomer product of the invention may be a static or dynamic type, static elastomers being products which are not subject to regular deformation during use (such as gasketing materials and certain types of rollers) and dynamic elastomers being products that are subjected to regular and repeated deformation as they are used. The elastomer of the invention is useful, for example, as gaskets and seals, tubing, rollers for many applications such as coating rollers, nip rollers, drive belts, squeeze rollers, business machine rollers, pulleys, conveyor wheels, fork truck wheels, tricycle wheels, caster wheels, industrial tires, rod wipers, snow plow blades, chute and cyclone liners, agitator blades and many more.

The elastomers may be non-cellular, cellular or microcellular. A cellular or microcellular elastomer can be formed by incorporating a physical and/or chemical blowing agent into the reaction mixture and curing the reaction mixture under conditions that the blowing agent produces a gas that becomes trapped in the cured material to produce cells. Alternatively or in addition, air, carbon dioxide, nitrogen or other gas can be whipped into the reaction mixture to form a froth, which is cured to form a cellular, or microcellular elastomer.

When making elastomers or other molded or shaped product, curing may take place in a mold or other form, which may be open or closed. It may be performed on a belt or other apparatus. The reaction mixture may be formed into a layer on a substrate and cured thereon to form a composite. A fibrous material may be impregnated with the reaction mixture, after which the reaction mixture is cured in place to form a fiber-reinforced composite.

Elastomer curing is generally performed at an elevated temperature. A suitable temperature is, for example at least 50° C., preferably at least 65° C., to 130° C., preferably to 110° C. or 100° C.

When forming elastomers or other shaped products, curing is generally continued until the elastomer has enough green strength to be manipulated without permanent damage. The gel time (gel point) as measured according to the method described in the examples may be, for example, 5 to 20 minutes. The demold time may be, for example, 5 minutes to 1 hour. The elastomer may be post-cured at an elevated temperature as just described to further complete the cure and develop mechanical and other properties.

Coatings are formed by applying the reaction mixture to the surface of a substrate to form a film and curing the film on the substrate to form an adherent coating. The application step is conveniently performed by a method such as spraying, brushing, rolling or immersion. Curing can be performed at ambient temperature or elevated temperature. The invention is particularly useful for producing thick protective coatings and/or to produce a soft surface. Coating compositions can be formulated to include pigments, dyes and other colorants as well as filler particles (which may also function as colorants), rheology modifiers of various types, and the like.

In the case in which the polyurethane is a sealant and/or adhesive, the reaction mixture is applied to a bondline, joint, crack or other opening between two substrates (or within parts of a single substrate) and cured in place such that it adheres to the substrate or substrates and at least partially seals the opening and/or bond the substrates together. Such an adhesive or sealant can be formulated with one or more fillers and colorants that are used to, for example, impart desired rheological and/or aesthetic characteristics, as well as urethane catalysts that promote a room temperature or other low temperature cure. Curing is generally performed under ambient conditions, but elevated temperatures can be used.

The following examples are provided to illustrate the invention, but are not intended to limit the scope thereof. All parts and percentages are by weight unless otherwise indicated.

Preparation of Catalysts

Catalyst 1 is (2,5-bis(trifluoromethyl)phenyl)bis(3,5-bis (trifluoromethyl) phenyl)borane, which is prepared as follows: n-butyllithium (6.0 mL, 2.46 M in hexanes, 14.8 mmol) is added over 30 minutes to a cold (−78° C., $CO_2(s)$ bath) solution of 1-bromo-2,5-bis(trifluoromethyl)benzene (4.32 g, 14.8 mmol) in diethyl ether (200 mL). The reaction mixture is stirred for 1 hour in the dry ice bath with formation of precipitate. Isopropoxybis(3,5-bis(trifluoromethyl)phenyl)borane (7.32 g, 14.8 mmol) in ether (20 mL) is added over 30 minutes. The reaction mixture is allowed to warm to ambient temperature while stirring overnight to give a clear yellow solution. An HCl solution in ether (15.0 mL, 2.0 M, 30 mmol) is added with formation of colorless precipitate. The reaction mixture is filtered and the volatiles are removed under a nitrogen stream while stirring overnight to give a light yellow sticky solid. Ether (100 mL) is added (not all of the solid dissolves). Additional HCl (5 mL, 10 mmol) is added and the mixture is stirred for 2 hours. The mixture is filtered and the volatiles are removed under reduced pressure. The residue is extracted with toluene, filtered, and the volatiles are removed under reduced pressure. The residue is extracted with hot hexane, filtered, and the resulting solution is concentrated until solids begin forming even at 60° C. The mixture is chilled overnight in the freezer. The supernatant is decanted, the solids are washed with hexane, and the solid is dried under reduced pressure.

Catalyst 2 is the THF adduct of bis(3,5-bis(trifluoromethyl)phenyl)(2,4,6-trifluorophenyl)borane, which is prepared as follows: In a first stage, 3.00 grams (14.2 mmol) of 1-bromo-2,4,6-trifluorobenzene is combined with 200 mL of diethyl ether in a 250 mL Schlenk flask and chilled in a −78° C. bath. A 2.5 M solution of n-butyllithium in hexane (5.8 mL, 14 mmol) is added via syringe to the cold solution and stirred for 1 hour. A solution of 7.05 grams of bis(3,5-bis (trifluoromethyl)phenyl)isopropoxyborane diethyl ether (25 mL0 is injected into the cold mixture and stirred for half an hour. The reaction mixture is allowed to slowly warm to room temperature while stirring overnight. The next morning, the solution is filtered and all volatiles are removed under vacuum to yield a yellow solid. The solid is extracted with hexane, the mixture is filtered and the volatiles are removed from the filtrate to give an off-white solid. The solid is triturated with hexane, the mixture is filtered, and the volatiles are removed from the filtrate under reduced pressure to give the product, lithium bis(diethyletherate) bis(3, 5-bis(trifluoromethyl)phenyl)(2,4,6-trifluorophenyl)isopropoxyborate, as a white solid.

In a second stage, 8.00 g (10.2 mmol) of lithium bis (diethyletherate) bis(3,5-bis(trifluoromethyl)phenyl)(2,4,6-trifluorophenyl)isopropoxyborate from stage 1 is dissolved in 100 mL of diethyl ether to form a colorless solution. Chlorotrimethylsilane (3.2 mL, 2.7 g, 25 mmol) is added with stirring to the solution at room temperature. The mixture is allowed to stir overnight at room temperature with formation of copious precipitate. The reaction mixture is filtered through Celite to remove LiCl and the volatiles are removed from the filtrate under reduced pressure. The residue is extracted into benzene, the solution is filtered, and the volatiles are removed from the filtrate under reduced pressure to give bis(3,5-bis(trifluoromethyl)phenyl)(2,4,6-trifluorophenyl)borane as a white powder.

In a third stage, 4.45 g (7.82 mmol) of bis(3,5-bis(trifluoromethyl)phenyl)(2,4,6-trifluorophenyl)borane from stage 2 is dissolved in ether (20 mL) and THF (2 mL) is added. The volatiles are removed under reduced pressure to give the product, the THF adduct of bis(3,5-bis(trifluoromethyl)phenyl)(2,4,6-trifluorophenyl)borane, as a white solid.

Preparation of Polyether Polyols

Polyol A is a commercially available poly(butylene oxide) homopolymer having a number average molecular 2000. Less than 2% of the hydroxyl groups are primary.

Polyol B is made by polymerizing butylene oxide onto a 400 molecular weight poly(propylene oxide) diol starter, in the presence of Catalyst 1. 67.3 parts of the starter and a solution of the catalyst in tetrahydrofuran are combined under nitrogen in a pressure reactor. After purging with nitrogen, the reactor vent is closed and 239.9 parts of butylene oxide are added at 55° C. at the rate of 1.25 parts/minute. The reaction mixture is digested for 20 minutes at the same temperature, followed by venting the reactor, purging with nitrogen at 90° C. and cooling. The product has a number average molecular weight of 2051, a hydroxyl equivalent weight of about 1025, a polydispersity of 1.06 and 54% of its hydroxyl groups are primary.

Polyol 1 is made by polymerizing butylene oxide onto a 400 molecular weight poly(propylene oxide) diol starter, in the presence of Catalyst 2. 65 parts of the starter and a solution of the catalyst in tetrahydrofuran are combined under nitrogen in a pressure reactor. After purging with nitrogen, the reactor vent is closed and 231.1 parts of butylene oxide are added at 55° C. at the rate of 1.25 parts/minute. The reaction mixture is digested for 20 minutes at the same temperature. 28.6 parts of ethylene oxide are added at a constant rate of 0.75 parts/minute. The reaction mixture is again digested, this time for 45 minutes at 55° C., followed by venting the reactor, purging with nitrogen at 90° C. and cooling. The product has a number average molecular weight of 1931, a hydroxyl equivalent weight of about 965, a polydispersity of 1.07 and 82% of its hydroxyl groups are primary. Polyol 1 contains 20% oxypropylene units, 8.8% oxyethylene units and 71.2% oxybutylene units.

Preparation of Elastomer 1 and Comparative Samples A and B

Elastomer Example 1 and Comparative Samples A and B are prepared in a "one-shot" process by combining 9.57 parts of polyol with 0.81 parts of 1,4-butanediol and 0.2 parts of a commercially available metal carboxylate catalyst (KKat®XK-604 from King Industries) on a laboratory mixer, followed by adding 4.6 parts of the polyisocyanate and mixing briefly. The resulting reaction mixture is poured into a 15.2 cm×15.2×0.155 cm chase and cured in a press for 30 minutes at 80° C. under about 1200 psi (8.3 MPa). The resulting elastomer is removed from the chase and post-cured for 16 hours at 80° C. The amount of ingredients is chosen for each of Example 1 and Comparative Samples A and B to produce an elastomer having a hard segment content of 36% by weight. No surfactants, solvents or other materials are included within the reaction mixture.

The polyisocyanate is a mixture of equal weights of a 143-equivalent weight carbodiimide modified MDI product and a 181 equivalent weight urethane group-containing MDI prepolymer, each having an isocyanate functionality of about 2 isocyanate groups per molecule.

Elastomer Example 1 and Comparative Samples A and B are made with Polyols 1, A and B, respectively.

The formulations are evaluated for gel point on a parallel plate rheometer under conditions of 1 rad/second frequency, stress of 10 Pa, and isothermal temperature of 80° C. An uncured portion of the reaction mixture is placed between the plates and loss and storage moduli are measured as a function of time. Gel point is taken as the time at which loss modulus equals storage modulus.

The elastomers are evaluated for hardness according to ASTM D2240-15e1 at 22° C. and 50% relative humidity. Tensile properties are measured according to ASTM D638 using type V specimens, at a rate of 50 mm/minute under conditions of 22° C. and 50% relative humidity. Glass transition temperatures are measured by dynamic mechanical analysis at 0.05% strain, 1 Hz frequency, temperature sweep of −80° C. to 200° C. at a ramp rate of 5° C. per minute. Water aging is evaluated by immersing samples in 70° C. water for 7 days and measuring the weight gain. Results are as indicated in Table 1.

TABLE 1

| | Result | | |
|---|---|---|---|
| Property | Comp. A* | Comp. B* | Ex. 1 |
| Gel Point, Min. | 8 | 8 | 7 |
| Shore A Hardness | 65 | 68 | 71 |
| Young's Modulus, MPa | 7.7 | 10.2 | 11.9 |
| Elongation, % | 654 | 541 | 512 |
| Soft Segment $T_g$, ° C. | −43 | −37 | −40 |
| Hard Segment $T_g$, ° C. | 128 | 131 | 128 |
| Water Uptake, % | 1.2 | 1.1 | 1.4 |

*Not an example of this invention.

Example 1 exhibits faster reactivity and produces an elastomer having a significantly higher modulus than either of the comparative samples, at comparable elongation. Very little change in water uptake is seen despite the presence of oxyethylene groups in the elastomer. This data demonstrates that by using a butylene oxide-ethylene oxide copolymer of the invention to prepare elastomers, faster reactivity and improved modulus can be obtained without sacrificing hydrophobicity.

Preparation of Elastomer 2 and Comparative Samples C and D

Elastomer Example 2 and Comparative Samples C and D are prepared in the same manner as Example 1 and Comparative Samples A and B respectively, except the amounts of ingredients are selected in each case to produce an elastomer having a hard segment content of 50% by weight. Thus in each case the amount of polyol is 8.7 parts, the amount of 1,4-butanediol is 1.3 parts, the amount of isocyanate is 6.2 parts and the amount of catalyst is 0.15 parts. As before, no surfactants, solvents or other materials are included within the reaction mixture.

Elastomer Example 2 and Comparative Samples C and D are made with Polyols 1, A and B, respectively.

The properties of the elastomers are determined as before and are indicated in Table 2.

TABLE 2

| | Result | | |
|---|---|---|---|
| Property | Comp. C* | Comp. D* | Ex. 2 |
| Gel Point, Min. | 6.2 | 6.5 | 5 |
| Shore A Hardness | 90 | 93 | 95 |
| Young's Modulus, MPa | 51.9 | 66.3 | 100.5 |
| Elongation, % | 370 | 327 | 427 |
| Soft Segment $T_g$, ° C. | −40 | −36 | −40 |

TABLE 2-continued

| Property | Result | | |
|---|---|---|---|
| | Comp. C* | Comp. D* | Ex. 2 |
| Hard Segment T$_g$, ° C. | 110 | 128 | 132 |
| Water Uptake, % | 1.0 | 0.8 | 1.0 |

*Not an example of this invention.

These results follow much the same trend as the data in Table 1. The inventive example cures significantly faster than either of the comparatives, and produces an elastomer with a very large increase in modulus while, very unusually, showing increased elongation. Water uptake is comparable to the samples, again demonstrating that that advantages in reactivity and mechanical properties are not obtained at the expense of hydrophobicity.

Preparation of Elastomer 3 and Comparative Samples E and F

Example 3 and Comparative Samples E and F are made in a "prepolymer" process. 32.3 parts of the polyol are reacted with the 26.9 parts of the polyisocyanate to form a prepolymer having an isocyanate content of about 9.5% by weight. 18.2 parts of the resulting prepolymer, 1.8 parts of 1,4-butanediol and 0.01 part of the metal carboxylate catalyst are combined in a laboratory mixer, poured into an open mold and cured as before to produce an elastomer having a hard segment content of 50% by weight.

Elastomer Example 3 and Comparative Samples E and F are made with Polyols 1, A and B, respectively.

The properties of the elastomers are determined as before and are indicated in Table 3.

TABLE 3

| Property | Result | | |
|---|---|---|---|
| | Comp. E* | Comp. F* | Ex. 3 |
| Shore A Hardness | 87 | 90 | 94 |
| Young's Modulus, MPa | 35.4 | 46.7 | 85.6 |
| Elongation, % | 390 | 380 | 386 |
| Soft Segment T$_g$, ° C. | −39 | −37 | −40 |
| Hard Segment T$_g$, ° C. | 125 | 128 | N.D. |
| Water Uptake, % | 1.0 | 1.1 | 1.0 |

*Not an example of this invention.

As the data in Table 3 demonstrates, similar advantages in mechanical properties are seen even when the elastomer is made using a prepolymer process. Hardness and modulus increase without loss of elongation and without loss of the desired hydrophobic behavior.

What is claimed is:

1. A hydroxyl-containing copolymer of butylene oxide and ethylene oxide, the copolymer of butylene oxide and ethylene oxide containing one or more internal poly(propylene oxide) blocks and one or more poly(butylene oxide) blocks external to the one or more internal poly(propylene oxide) blocks, the copolymer of butylene oxide and ethylene oxide having a hydroxyl equivalent weight of 800 to 1200, an average of 1.8 to 6 hydroxyl groups per molecule of which hydroxyl groups 75% to 95% are primary hydroxyl groups, an oxybutylene content of 65 to 90% by weight and an oxypropylene content of 5 to 25% by weight based on the weight of the copolymer and which contains 5 to 10% by weight oxyethylene units based on the weight of the copolymer wherein the oxyethylene units are present as single units or blocks at the termini of chains of the hydroxyl-containing copolymer, which copolymer is made by polymerizing butylene oxide and then ethylene oxide onto a poly(propylene oxide) starter in the presence of a Lewis acid catalyst having the general formula $$M(R^1)_1(R^2)_1(R^3)_1(R^4)_{0 \text{ or } 1}$$

wherein M is boron, aluminum, indium, bismuth or erbium, $R^1$ is a fluoroalkyl-substituted phenyl group and $R^2$ and $R^3$ each are a fluoroalkyl-substituted phenyl group, a fluoro-substituted phenyl group, a chloro-substituted phenyl group or a fluoro- and chloro-substituted phenyl group, provided that $R^1$, $R^2$ and $R^3$ are not all the same, and $R^4$ is a functional group or functional polymer group.

2. The hydroxyl-containing copolymer of claim 1 which has an average of 2 to 4 hydroxyl groups per molecule and a polydispersity of 1 to 1.175.

3. A polyurethane which is a reaction product of at least one polyisocyanate and isocyanate-reactive materials that include at least one chain extender and at least one hydroxyl-containing copolymer of claim 1, wherein the at least one polyisocyanate and the at least one chain extender together constitute 15 to 60% of the total combined weight of the one or more polyisocyanates and isocyanate-reactive materials.

4. A one-shot method for making a polyurethane, comprising forming a reaction mixture comprising one or more polyisocyanates, wherein the one or more polyisocyanates has a number average isocyanate equivalent weight of no greater than 200, and isocyanate-reactive materials that include at least one chain extender and at least one hydroxyl-containing copolymer of claim 1, and curing the reaction mixture in one step to form the polyurethane, wherein the one or more polyisocyanates and the at least one chain extender together constitute 15 to 60% of the total combined weight of the one or more polyisocyanates and isocyanate-reactive materials.

5. A one-shot method of claim 4, wherein the reaction mixture is cured in the presence of no more than 5%, based on the weight of the reaction mixture, of a solvent, to form the polyurethane.

6. The one-shot method of claim 4 wherein the at least one chain extender is 1,4-butanediol and the polyisocyanate is a mixture of a 143-equivalent weight carbodiimide modified diphenylmethane diisocyanate product having an isocyanate functionality of about 2 isocyanate groups per molecule and a 181 equivalent weight urethane group-containing diphenylmethane diisocyanate prepolymer having an isocyanate functionality of about 2 isocyanate groups per molecule.

* * * * *